Patent Number: 4,603,176
… Date of Patent: Jul. 29, 1986

[54] TEMPORARY WET STRENGTH RESINS

[75] Inventors: David W. Bjorkquist, Wyoming; William W. Schmidt, Cincinnati, both of Ohio

[73] Assignee: The Procter & Gamble Company, Cincinnati, Ohio

[21] Appl. No.: 748,655

[22] Filed: Jun. 25, 1985

[51] Int. Cl.[4] .............................................. C08F 8/00
[52] U.S. Cl. ........................ 525/329.4; 162/168.3; 162/168.4; 525/383; 526/304
[58] Field of Search ................... 526/304, 293, 263; 525/329.4, 383; 162/168.3, 168.4

[56] References Cited

U.S. PATENT DOCUMENTS

| | | | |
|---|---|---|---|
| 3,096,228 | 7/1963 | Day et al. | 162/112 |
| 3,556,932 | 1/1971 | Cosica et al. | 162/166 |
| 3,709,857 | 1/1973 | Faessinger | 162/167 |
| 3,740,391 | 6/1973 | Williams et al. | 260/233.3 R |
| 3,772,259 | 11/1973 | Williams et al. | 260/88.7 R |
| 3,772,407 | 11/1973 | Williams et al. | 260/875 |
| 3,773,736 | 11/1973 | Williams et al. | 260/68 |
| 3,790,537 | 2/1974 | Panzer et al. | 260/80.3 N |
| 4,217,425 | 8/1980 | Ballweber et al. | 525/155 |

OTHER PUBLICATIONS

Stannett, "Mechanisms of Wet-Strength Development in Paper" *Surfaces Coatings Related Paper Wood, Symp.,* Syracuse, N.Y., 1967, 269-99.

*Primary Examiner*—Paul R. Michl
*Attorney, Agent, or Firm*—David K. Dabbiere; Steven J. Goldstein; Richard C. Witte

[57] ABSTRACT

Temporary wet strength resin polymers having the formula

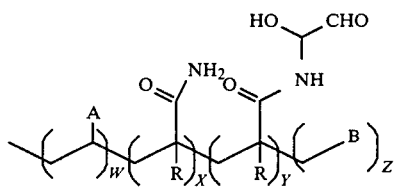

wherein A is a polar, non-nucleophilic unit which does not cause said resin polymer to become water-insoluble; B is a hydrophilic, cationic unit which inparts a positive charge to the resin polymer; each R is H, $C_1$–$C_4$ alkyl or halogen;

wherein the mole percent of W is from about 5% to about 95%; the mole percent of X is from about 3% to about 65%; the mole percent of Y is from about 1% to about 20%; and the mole percent of Z is from about 1% to about 10%; said resin polymer having a molecular weight of from about 5,000 to about 200,000. These resins, when incorporated into paper products provide good dry and initial wet tensile strength together with excellent wet tensile decay.

12 Claims, No Drawings

TEMPORARY WET STRENGTH RESINS

TECHNICAL FIELD

This invention relates to wet strength resins with time dependent wet tensile decay and to paper products containing these resins.

BACKGROUND OF THE INVENTION

Wet strength is a desirable attribute of many disposable paper products, such as napkins, paper towels, household tissues, disposable hospital wear, etc., which come into contact with water in use. However, an untreated cellulose fiber assemblage will typically lose 95% to 97% of its strength when saturated with water. To improve the wet strength paper manufacturers have for years been adding chemicals during the paper making process.

These wet strength additives result in a permanent wet strength, i.e., paper which when placed in an aqueous medium retains its initial wet strength over time. Permanent wet strength in the paper products is often an unnecessary and undesirable property. Paper products such as toilet tissues, etc., are generally disposed of after brief periods (within about 5 minutes) of use into septic systems and the like. Clogging of these systems can result if the paper product permanently retains its hydrolysis-resistant strength properties.

Consequently there is a need to develop a wet strength resin that will produce a paper product with good initial wet strength and which retains sufficient wet strength for its intended use, but when disposed of in a septic system has lost sufficient wet tensile strength so as to clear the septic system.

In spite of the successful use of chemicals to increase permanent wet strength, the mechanism by which wet strength additives work is not totally understood. See Stannet "Mechanisms of Wet Strength Development in Paper" *Surface Coatings Related Paper Wood Symp.* pp. 289–99 (1967) and Westfelt, "Chemistry of Paper Wet Strength. I. A Survey of Mechanisms of Wet Strength Development", *Cellulose Chemistry and Technology* Vol. 13, pp. 813–825 (1979).

Cellulose fibers have adequate strength when dry; this dry strength is thought to result from strong interfiber hydrogen bonding. When the fibers are wetted, water will penetrate the fibers, disrupt the internally hydrogen bonded network and, as a consequence, lower the strength of the paper. Therefore, any approach to improve the wet strength of paper must either prevent water from reaching and disrupting internal hydrogen bonds or allow for the formation of new bonds incapable of being broken by water. Both approaches are being practiced in the art, but it is the latter which has been the historical method of choice.

In this latter method a relatively low molecular weight, water soluble resin (wet strength agent) is added to the pulp before the paper product is formed (wet-end addition). In order for the resin to provide wet strength in the finished product, two events must then occur. First, the resin must be retained by the fiber and secondly there must be formation of new chemical bonds. Since cellulose always carries some negative charge due to the presence of carboxylic acid groups, the resin is frequently designed to be cationic.

The most common wet strength resins include the urea-formaldehyde and melamine-formaldehyde type resins. These types of resins require curing under acidic conditions. Curing can be accomplished by storing paper which has been treated with a urea-formaldehyde resin at ambient temperatures for a period of days during which time the wet strength develops, or by the application of heat which can accelerate the cure rate to a matter of minutes. However, due to this requirement of acidic conditions (pH of about 4 or 5) for curing, corrosion of the papermaking equipment and premature embrittlement of the paper frequently occur. Alternative resins such as polyamide-epichlorohydrin wet strength resins can be used. Yet paper utilizing these resins also requires an aging period at ambient temperature. Again, curing can be accelerated by the addition of heat. However, storage and/or the addition of heat to the paper product poses a serious handicap to its rapid production, as well as increasing its cost of production.

To avoid these problems, wet strength resins formed by reacting glyoxal (CHOCHO) with water-soluble vinylamide polymers have been suggested by U.S. Pat. No. 3,556,932 to Coscia et al., issued Jan. 19, 1971. Papers incorporating such resins lose only about half their wet strength upon exposure to water. Paper products with this level of wet tensile decay could cause substantial septic system clogging. U.S. Pat. No. 3,709,857 to Faessinger, issued Jan. 9, 1973, suggests reacting glyoxal with acrylamide and then polymerizing the glyoxalated acrylamide with acrylamide in the presence of a basic nitrogen-containing monomer. Unfortunately, paper products made according to these methods also have too much permanent wet strength.

As discussed above, permanent wet strength is often unnecessary and undesirable. The temporary wet strength resin of the present invention has a good initial wet strength and loses sufficient wet tensile strength to clear a septic system without clogging. This is a property that is not fulfilled by the urea-formaldehyde, polyamide-epichlorohydrin or glyoxylated acrylamide resins described above. None of these resins lose much more than 50% of their initial wet tensile even after prolonged exposure to aqueous solution. U.S. Pat. No. 3,096,228 to Day et al., issued July 2, 1983, describes paper products wherein a solution of glyoxal is applied to a paper web. Upon exposure to water, this paper is able to resist a rupture for only about a minute and disintegrates within about 3 minutes, therefore not providing sufficient wet strength for any appreciable length of time. Additionally, glyoxal cannot be added to the wet-end of the papermaking process because glyoxal carries no cationic charge and is therefore not substantive to cellulosic fibers.

U.S. Pat. No. 3,740,391 to Williams et al., issued June 19, 1973, describes a water-soluble thermosetting wet strengthening agent for paper which is prepared by reacting an amidated ionic glucopyranosyl compound with glyoxal. Paper products containing this wet strength resin lose about one half their original wet strength during 24 hours of normal wet weathering. Such paper products are not suited to use as toilet tissues and the like since their wet strength degradation is far too slow. This is unacceptable for normal septic systems.

It is therefore an object of this invention to provide paper products which can be easily disposed of in normal septic systems.

It is a further object of this invention to produce paper products which lose their wet tensile strength over an appropriate period of time in an aqueous medium.

It is still a further object to provide effective temporary wet strength resins which do not adversely affect softness and absorbency when incorporated into paper products.

These and other objects of this invention will become apparent by the description of this invention below.

SUMMARY OF THE INVENTION

The present invention encompasses temporary wet strength resin polymers with a molecular weight of from about 5,000 to about 200,000 having the formula:

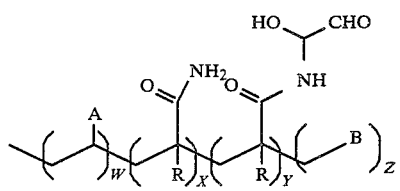

wherein A is a polar, non-nucleophilic unit which does not cause said resin polymer to become water-insoluble; each R is H, $C_1-C_4$ alkyl or halogen; B is a hydrophilic, cationic unit which imparts a positive charge to the resin polymer; and wherein the mole percent of W ranges from about 5% to about 95%; the mole percent of X ranges from about 3% to about 65%; the mole percent of Y ranges from about 1% to about 30%; and the mole percent of Z ranges from about 1% to about 10%.

The present invention also encompasses paper products containing these temporary wet strength resins.

DETAILED DESCRIPTION OF THE INVENTION

The temporary wet strength resins of this invention comprise water-soluble ionic polymers having a molecular weight of from about 5,000 to about 200,000, preferably from about 5,000 to about 112,000, of the formula:

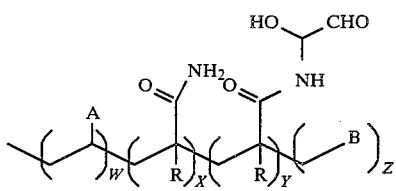

wherein A is a polar, non-nucleophilic unit which does not cause said temporary wet strength resin polymer to become water-insoluble, preferably A is selected from the group consisting of

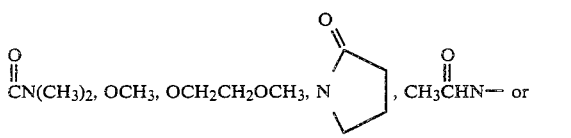

most preferably

A is $CN(CH_3)_2$;

each R is H, $C_1-C_4$ alkyl or halogen, preferably R is H or $CH_3$; B is a hydrophilic cationic unit which imparts a positive charge to the resin polymers; preferably B is selected from the group consisting of 2-vinyl-N-methylpyridinium chloride, diallyldimethyl ammonium chloride, (p-vinylphenyltrimethyl ammonium chloride, 2-(dimethylamino)ethyl acrylate, trimethyl(p-vinylbenzyl)ammonium chloride, p-dimethylaminoethylstyrene, dimethylaminopropyl acrylamide, 2-methylacroyloxyethyltrimethyl ammonium methyl sulfate and 3-acrylamido-3-methylbutyltrimethyl ammonium chloride; and wherein the mole percent of W ranges from about 5% to about 95%, preferably from about 30% to about 85%; the mole percent of X ranges from about 3% to about 65%, preferably from 9% to about 60%; the mole percent of Y ranges from about 1% to about 30%, preferably from about 5% to about 20% and the mole percent of Z ranges from about 1% to about 10%, preferably from about 1% to about 5%.

Applicants believe that the rate of wet tensile decay in paper products containing a wet strength resin which develops its strength through the formation of both hemiacetal bonds (co-crosslinking) and amidol bonds (homo-crosslinking) is proportional to the relative number of the two types of bonds produced. Hemiacetal bonds result from the reaction of cellulose hydroxyl groups with the aldehyde functionality of the resin polymer (i.e. co-crosslinking) while amidol bonds arise from the reaction of primary amide groups of one resin polymer with the aldehyde functionality of a second resin polymer (i.e. homo-crosslinking).

Hemiacetal bonds contribute to a fast rate of decay in the paper products. The rate of decay of hemiacetal bonds has been measured to be orders of magnitude faster than amidol bonds at a neutral pH. Therefore, the rate of wet tensile decay is increased when the relative proportion of amidol bonds is decreased. The number of amidol bonds can be reduced by reducing the number of primary amide groups in the wet strength resin.

The present invention is a combination of monomers creating a polymer backbone which, when capped with glyoxal (CHOCHO), is useful as a wet strength resin with time dependent wet tensile decay in cellulose products. In forming the resin polymer backbone, three types of monomers are combined: a hydrophilic, non-nucleophilic monomer which is not reactive toward glyoxal and which does not render the polymer backbone water insoluble; a hydrophilic, nucleophilic monomer which serves as the site of attachment for glyoxal; and a hydrophilic, cationic monomer which imparts a positive charge to the polymer backbone. It is understood that one could use one of or a mixture of monomers from each type, and it is also understood that monomers within a given class can be substituted generally without affecting the chemical properties of the resulting resins.

The hydrophilic, non-nucleophilic monomer reduces the number of nucleophilic sites on the polymer backbone. Consequently, the number of amidol bonds formed during the curing of the wet strength resin is lowered, and the ratio of hemiacetal to amidol bonds is increased. This allows for a faster rate of wet tensile decay owing to the greater rate of decay of a hemiacetal bond relative to an amidol bond.

The hydrophilic, non-nucleophilic monomer

can be any polar, non-nucleophilic monomer which does not cause the resin polymer to become water insoluble. Preferred non-nucleophilic monomers are those where A is

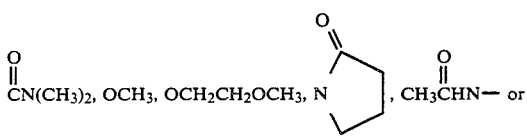

Preferably,

Further substitution at the head of the olefin with alkyl, aryl or halogen groups can be tolerated without affecting the performance of the resin polymer. There must be at least 5 mole percent of the non-nucleophilic unit present in the resin polymer backbone. The best results are obtained where the polymer contains from about 30 mole percent to about 85 mole percent of this component.

The cationic unit (B) imparts a positive charge to the polymer backbone. Cationic monomers suitable for reaction with the other monomers of the present invention to form the resin polymer backbone are those which carry a positive electrostatic charge when dissolved in water. The counterion can be chloride, fluoride, bromide, iodide, sulphate, methylsulfate, phosphate and the like. Preferred cationic monomers include 2-vinyl-N-methylpyridinium chloride, diallyldimethyl ammonium chloride, (p-vinylphenyl)trimethyl ammonium chloride, 2-(dimethylamino)ethyl acrylate, trimethyl(p-vinylbenzyl)ammonium chloride, p-dimethylaminoethylstyrene, dimethylaminopropyl acrylamide, 2-methylacroyloxyethyltrimethyl ammonium methylsulfate and 3-acrylamido-3-methylbutyl trimethyl ammonium chloride. There must be at least 1 percent to about 10 percent of the cationic unit present in the resin backbone. Preferably, there is not more than about 5 percent of the cationic unit present.

Hydrophilic, nucleophilic units useful in the present invention are primary vinylamides. Preferred vinylamides are acrylamide and methacrylamide. Before the capping reaction with glyoxal, there must be at least four mole percent of the primary vinylamide monomer units incorporated into the polymer backbone. Best results are obtained when there is at least fourteen mole percent of primary vinylamide units present in the polymer backbone before reacting with glyoxal.

The hydrophilic non-nucleophilic monomer

primary vinylamide and the cationic monomer

are combined and polymerized to form the polymer backbone. Using, for example, diallyldimethyl ammonium chloride as the cationic monomer and acrylamide as the primary vinylamide, the resin polymer backbones described herein are readily synthesized via the following general synthetic scheme:

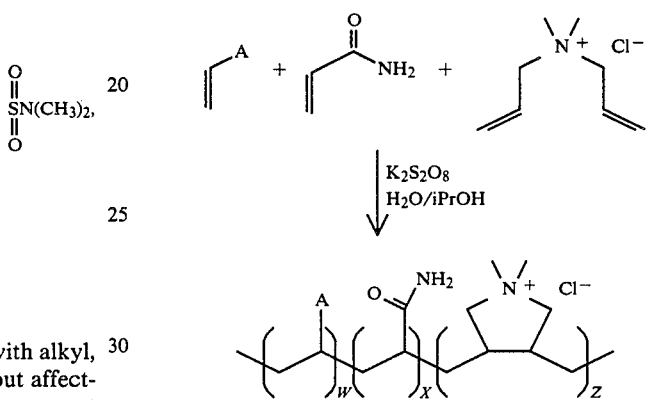

This resin polymer backbone is then reacted with glyoxal. As discussed above, the primary vinylamide unit of the backbone provides the site to which the glyoxal readily attaches:

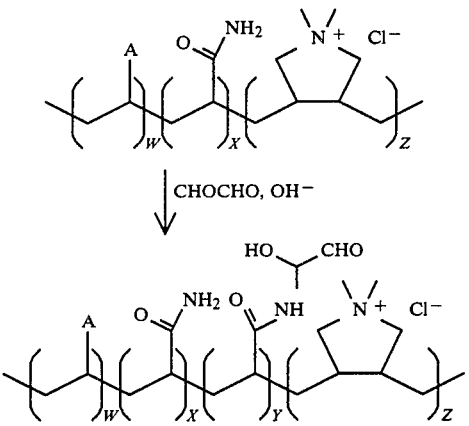

For the present invention, at least 1% of the primary vinylamide unit present in the polymer backbone must react with the glyoxal to form the glyoxalated acrylamide unit in order to produce the resin of the present invention. The procedure to determine the amount of bound glyoxal is described in *Biochemistry*, Vol. 81, pp. 47–56 (1977), which is incorporated by reference herein. The reaction conditions to bind the glyoxal to the primary vinylamide which are useful in the present invention are described in U.S. Pat. No. 3,556,932 to Coscia et al., issued Jan. 19, 1971, which is also incorporated by reference.

Preferred temporary wet strength resins of the present invention include those wherein the hydrophilic non-nucleophilic monomer is dimethylacrylamide, the primary vinylamide is acrylamide and the cationic monomer is selected from 2-vinyl-N-methylpyridinium chloride.

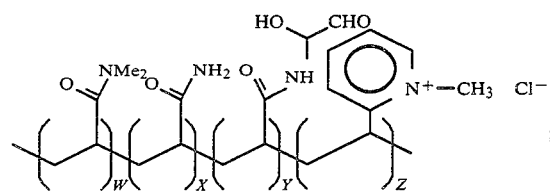

Me = CH₃ diallyldimethyl ammonium chloride

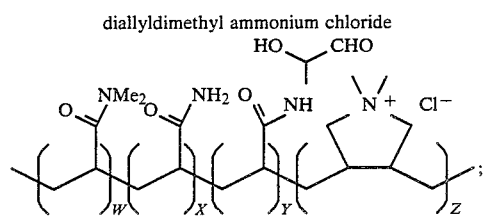

(p-vinylphenyl)trimethyl ammonium chloride

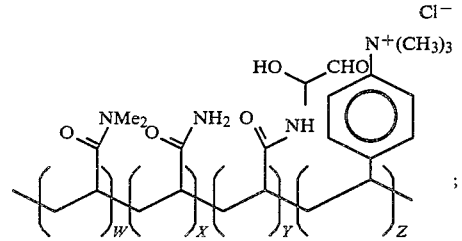

2-(dimethylamino)ethyl acrylate

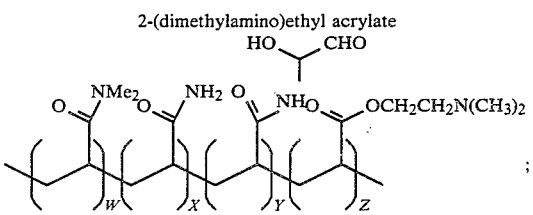

trimethyl(p-vinylbenzyl) ammonium chloride

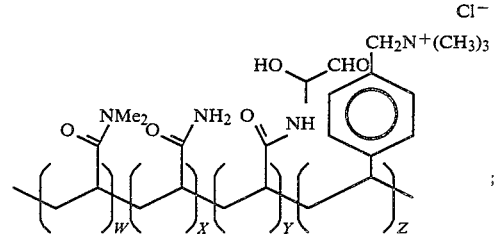

p-dimethylaminoethyl styrene

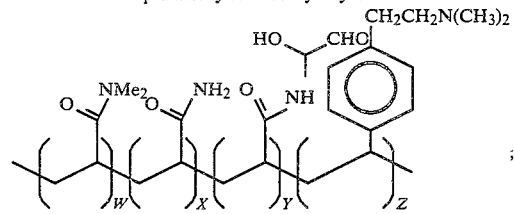

dimethylaminopropyl acrylamide

-continued

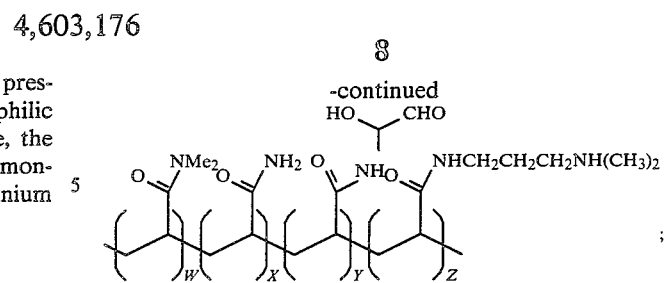

methacryloyloxyethyltrimethyl ammonium methylsulfate

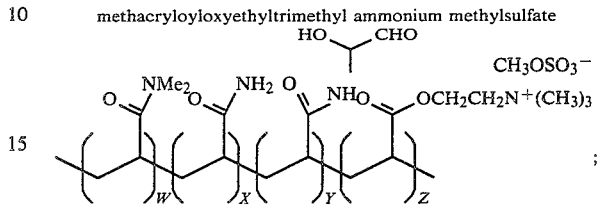

3-acrylamido-3-methylbutyltrimethyl ammonium chloride

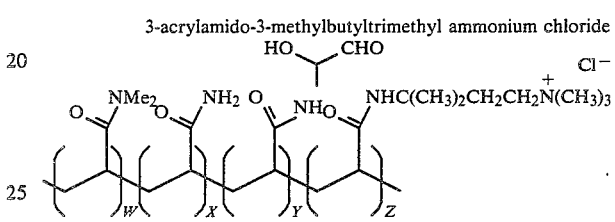

It should be noted that those units (B) which are not explicitly cationic as drawn, will protonate in the neutral or acidic aqueous medium commonly used in paper making processes to form an ammonium ion.

Other preferred temporary wet strength resins of the present invention include those wherein the cationic monomer

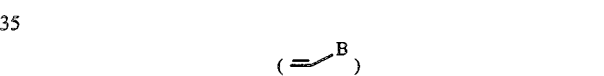

is diallyldimethyl ammonium chloride, acrylamide and the hydrophilic, non-nucleophilic monomer is methyl vinyl ether

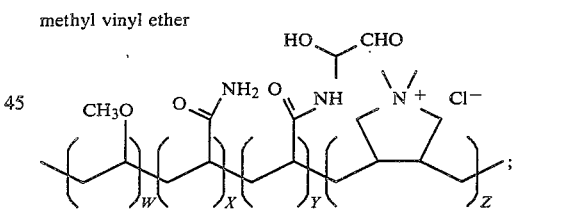

methoxyethyl vinyl ether

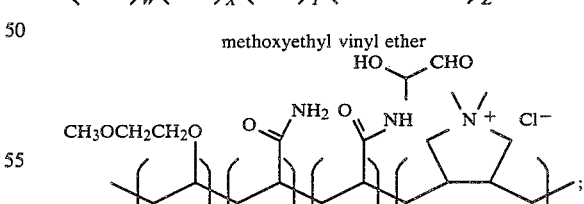

N—vinylpyrrolidone

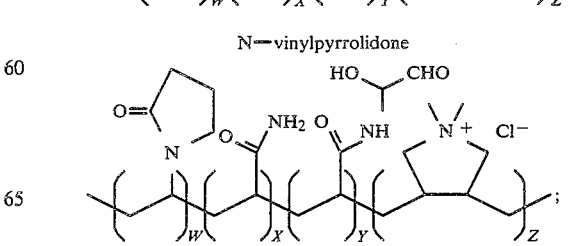

N—vinylacetamide

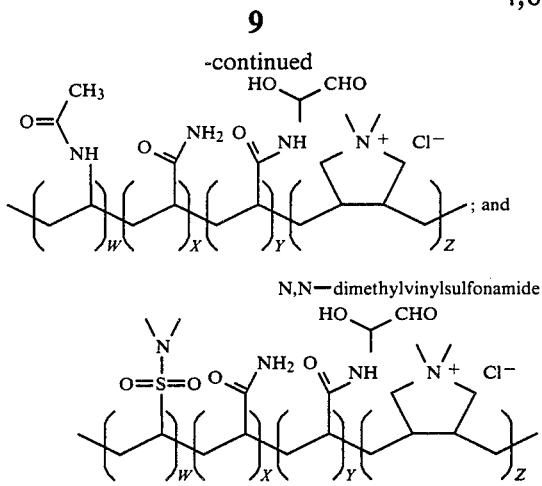

; and

N,N—dimethylvinylsulfonamide

The precise mechanism by which the temporary wet strength resin of the present invention imparts such excellent wet and dry strength, as well as being able to exhibit excellent decay over a period of time, is unknown. However, while Applicant does not wish to be bound by theory, it is believed that wet strength is generated by the formation of hemiacetal bonds (co-crosslinking) which form when the temporary wet strength resin bonds to the cellulose; and by amidol bonds (homo-crosslinking) which form when resin attached to one cellulose fiber bonds to the resin attached to another fiber. In order to lose wet strength, these same two bonds must break. It is believed that the rate of amidol bond breaking is much slower than that of hemiacetal bond breaking under normal conditions. By controlling the relative number of these bonds, the rate of tensile decay of the cellulose product upon wetting can be controlled. The role of the non-nucleophilic unit is to lower the amount of amide available to the glyoxal, thus reducing the number of slow breaking bonds.

The molecular weight of the resin of the present invention ranges between 5,000 and 200,000. It has been found that resins with high molecular weights (i.e. those in excess of 200,000) decay unacceptably slowly. They do not achieve a wet tensile decay of at least 35% after 5 minutes and at least 65% after 30 minutes. Those with extremely low molecular weights (i.e. those less than 5,000) have virtually no initial wet strength and are therefore unacceptable as wet strength resins for paper products. It has been found that molecular weights ranging from about 5,000 to about 112,000 are particularly good at imparting both good initial wet tensile and excellent temporary wet tensile decay.

In forming paper products, the temporary wet strength resins of the present invention are added as dilute aqueous solutions at any point in the papermaking process where wet strength resins are customarily added. Such nonfibrous additions are described in Young, "Fiber Preparation and Approach Flow" *Pulp and Paper Chemistry and Chemical Technology*, Vol. 2, pp 881-882, which is incorporated by reference.

The cationic temporary wet strength resin polymers of the present invention are readily absorbed by the cellulose fibers at pH values within the range of 3.5-8. The polymer develops its wet strength both at room temperature and at temperatures at which paper is normally dried (190° F.-250° F.).

A substantial amount of initial wet strength is imparted to the paper product when from about 0.005% to about 2% of the temporary wet strength resin by weight of the fiber is added. Typically, best results, i.e., around 35% of tensile decay at 5 minutes and around 65% at 30 minutes, are achieved when about 0.25% to about 0.5% of the resin by weight of the fiber is added, and when from 30 mole percent to about 85 mole percent of the non-nucleophilic unit is present in the resin polymer. When lower levels of this unit are added, there is an insufficient amount of wet tensile decay over time. When greater than 85% of the non-nucleophilic unit is present, the paper product does not have good initial wet strength.

The following non-limiting examples further illustrate the synthesis, properties and use of the temporary wet strength resins of the present invention.

EXAMPLE I

A glyoxal-capped acrylamide-N,N-dimethylacrylamide-diallyldimethyl ammonium chloride polymer was synthesized by the following method:

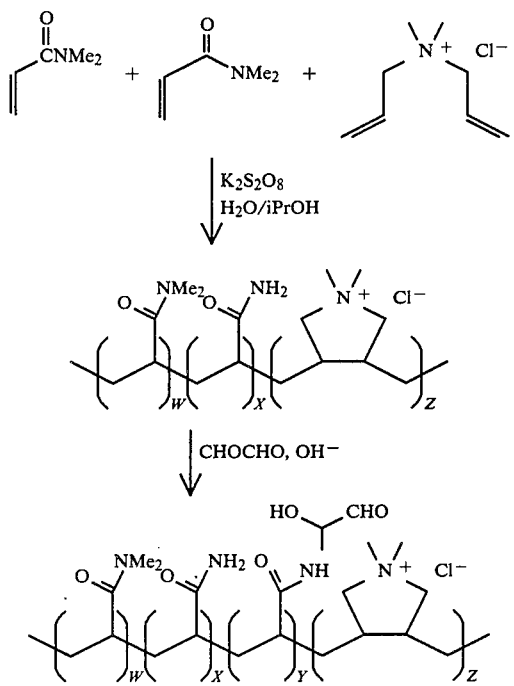

wherein W=46, X=35, Y=16 and Z=4. The molecular weight of this compound was 15,000.

Specifically, 12.9 g (0.181 moles) acrylamide, 17.1 g (0.172 moles) N,N-dimethylacrylamide, 6.7 g (0.041 moles) diallyldimethylammonium chloride, 55.5 g isopropanol, 62.5 g water and 0.3 g potassium persulfate were added to a 250 ml three necked flask equipped with a thermometer, condenser and mechanical stirrer. The reaction mixture was heated from room temperature to 70±3° C. and was maintained at this temperature for three hours. The reaction was terminated by cooling the mixture to room temperature and then dialyzing (Spectropor 3 tubing with molecular weight cut off at 3500) for 24 hours against water to remove any unreacted monomer. The polymer solution was then concentrated by rotoevaporation and the polymer backbone isolated by precipitation from acetone. The residual solvent was then removed by vacuum drying. To cap this polymer backbone, a 5% solution by weight was prepared by dissolving 1 g of the polymer backbone in 20 ml of a 0.1 m phosphate buffer. 3.4 g of 40% aqueous glyoxal was added to this solution. The pH of the resulting solution was adjusted to 7.5 with a pH stat (Radiometer Copenhagen Titrigraf) This mixture was then heated to 30° C. using a constant temperature bath, and kept at this temperature for 24 hours. The reaction was terminated by adding sufficient HCl to lower the pH to 3.5.

EXAMPLE II

A glyoxal-capped methylacrylamide-N,N-dimethylacrylamide-diallyldimethyl ammonium chloride terpolymer is synthesized by repeating the procedure of Example I except that 15.4 grams of methacrylamide is substituted for acrylamide.

EXAMPLE III

A glyoxal-capped acrylamide-N,N-dimethylacrylamide-2-(dimethylamino)ethyl acrylate terpolymer is synthesized by repeating the procedure of Example 1 except that 2.3 g of 2-(dimethylamino)ethyl acrylate is substituted for the 6.7 g of diallyldimethyl ammonium chloride.

EXAMPLE IV

A glyoxal-capped acrylamide-N-vinylpyrrolidone-2-vinyl-N-methylpyridium chloride terpolymer is synthesized by repeating the procedure of Example I except that 19.1 g of N-vinylpyrrolidone is substituted for the 17.1 g of N,N dimethylacrylamide and 3.2 g of 2-vinyl-N-methylpyridium chloride is substituted for the 6.7 g of diallyldimethyl ammonium chloride.

The dry tensile, initial wet tensile and wet tensile decay properties of paper products incorporating resins of the present invention were tested as follows.

Test Methods

All handsheets were formed from approximately 60% by weight unrefined Northern Softwood Kraft and 40% mixed hardwood bleached sulfite. The pulps were intimately mixed, the wet strength resin was added to the disintegrated pulp, and then the slurry was agitated one minute. Handsheets were made essentially according to TAPPI standard T205, with the following modifications:

(1) natural water, adjusted to pH 6.5 with HCl was used;

(2) the sheet was formed on a polyester wire and dewatered by suction instead of pressing;

(3) the embryonic web was transferred by vacuum to a polyester papermaking fabric; and (4) the sheet was then dried by steam on a rotary drum drier.

Sample Preparation

Strips of the sample were cut in both the machine and cross-direction using a JDC or Alpha cutting device. These sample strips were 4" long for wet and dry tensile testing and 3½" long for wet tensile decay testing. If required the samples were cured prior to testing. Curing was accomplised by attaching a small clip or clamp to the very end of the strips of the sample. The other end of the strips were "fanned" to separate them and allow circulation of air between them. The strips were suspended by the clamp in a 225°±5° F. forced draft oven for 5 minutes±10 seconds. The period of time the oven door was open during the placing or removing of samples was kept to a minimum so that the oven remained within the temperature specifications during the entire time period. After the heating period, the sample was removed from the oven and cooled for 3 minutes.

Strength Test

1. Dry Tensile

This test was performed in a conditioned room where the temperature was 73±4° F. and the relative humidity was 50±10%. An electronic tensile tester (Intelect 500) was operated at a crosshead speed of 4 inches per minute and a gauge length of 2 inches. The test strips were 4 inches long and the strips were mounted by centering them in the upper clamp. After the strips hung freely with no slack, the lower clamp was closed. The load was recorded when the crosshead automatically returned.

2. Wet Tensile (5 second soak)

An electronic tensile tester (Intelect 500) was operated at a crosshead speed of 1 inch per minute. The tensile device was fastened in the lower clamp of the tensile tester such that the horizontal rod was parallel to the clamp faces and was otherwise symmetrically located with respect to the clamps. The position of the lower clamp was adjusted so that the horizontal axis of the rod was exactly 1" below the upper clamp. The liquid container was filled to ⅛" from the top of the container with distilled water. The portion of the test product being measured was threaded under the rod in the wet tensile device. The ends of the specimen were placed together, the slack was removed and the upper clamp fastened. The specimen was centrally located with respect to the horizontal rod and the upper clamp. The liquid container was raised immersing the looped end of the specimen to a depth of at least ¾". Exactly 5 seconds after the liquid container was raised in place and with the liquid container remaining in place the tensile tester was engaged. The load was recorded.

3. Temporary Wet Tensile (5 minute soak)

The specimen was clamped to the device as described above. The liquid container was raised to its uppermost position immersing the looped end of the specimen to a depth of at least ¾" in standard tap water. The standard tap water contained approximately 23 parts per million (ppm) calcium ion, 7 ppm magnesium ion and 67 ppm sodium bicarbonate. 5 minutes±30 seconds after the liquid container was raised in place the tensile load was again read.

Decayed Wet Tensile (30 minute soak)

The procedure as above was followed with the exception that the specimen was immersed in the same standard tap water solution for 30 minutes±30 seconds rather than 5 minutes.

CALCULATIONS

A. Dry Tensile

The machine direction (MD) and cross direction (CD) dry tensile was calculated as follows:

MD average dry tensile strength (g/in) =     a.

$$\frac{\text{sum of loads at peak for } MD \text{ tests run}}{\text{total number of tensile strips tested}}$$

CD average dry tensile strength (g/in) =     b.

$$\frac{\text{sum of loads at peak for } CD \text{ tests run}}{\text{total number of tensile strips tested}}$$

B. Wet Tensile

The machine direction (MD) and cross direction (CD) wet tensile (5 second soak) was calculated as follows:

MD average wet tensile strength (g/in) = a.

$$\frac{\text{sum of loads at peak for } MD \text{ tests run}}{2 \times \text{total number of tensile strips tested}}$$

CD average wet tensile strength (g/in) = b.

$$\frac{\text{sum of loads at peak for } CD \text{ tests run}}{2 \times \text{total number of tensile strips tested}}$$

2. Calculation of total Wet Tensile (TWT)
TWT = MD average wet tensile strength + CD average wet tensile strength (g/in)
C. Wet Tensile Decay (5 minutes and 30 minutes)
% Total Wet Tensile Loss
The percentage of the wet tensile lost (decayed) under the test conditions specified in Wet Tensile Decay (5 or 30 Minute Soak) was calculated as follows:

% Total Wet Tensile Loss =

$$\frac{(\text{Cured total wet tensile } (TWT) - \text{Uncured total decayed wet tensile } (TDWT)) \times 100}{\text{Uncured total wet tensile } (TWT)}$$

EXAMPLE V

Handsheets containing 0.5% of the wet strength resin of Example I were tested for dry tensile, initial wet tensile and wet tensile decay as described in the Test Methods section. Results are presented below:

| Strength Testing | | | Wet Tensile Decay (%) | |
|---|---|---|---|---|
| dry (g/in) | wet (g/in) | wet/dry (%) | 5 min. | 30 min. |
| 936 | 137 | 15 | 60 | 77 |

Control

Hand sheets containing 0.5% of several wet strength resins of the prior art (U.S. Pat. No. 3,556,932) with the following formula:

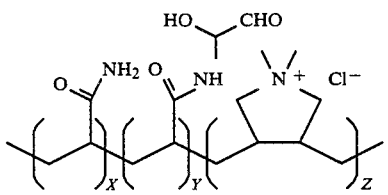

and a molecular weight of 30,000 were made according to the procedure described above in Example I. The hand sheets were then tested for dry tensile, wet tensile and wet tensile decay as described above in the Test Methods section. Results are presented below.

| Resin Composition (mole %) | | | Initial Strength | | | Wet Tensile decay (%) | |
|---|---|---|---|---|---|---|---|
| X | Y | Z | Dry | Wet | (wet/dry %) | 5 min | 30 min |
| 97 | 0 | 3 | 639 | 17 | 2.7 | 35 | 35 |
| 94 | 3 | 3 | 731 | 80 | 10.9 | 48 | 64 |
| 92 | 5 | 3 | 835 | 116 | 13.9 | 44 | 53 |
| 91 | 6 | 3 | 860 | 134 | 15.6 | 46 | 54 |
| 91 | 6 | 3 | 889 | 147 | 26.5 | 44 | 54 |

These data demonstrate unacceptably low wet strength decay. Substantial septic system clogging could occur with paper products using such a resin.

EXAMPLE VI

Handsheets containing 0.5% of the temporary wet strength resin of the present invention with the following composition:

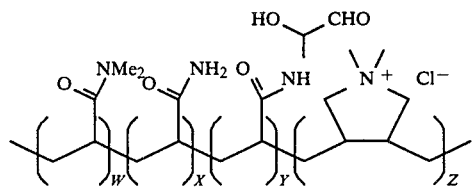

and a molecular weight of 30,000 were made according to the procedure described above in Example I. The handsheets were then tested for dry tensile, initial wet tensile and wet tensile decay as described above in the Test Methods section. Results are presented below.

| Resin Composition (mole %) | | | | Initial Strength | | | Wet Tensile decay (%) | |
|---|---|---|---|---|---|---|---|---|
| W | X | Y | Z | Dry | Wet | (wet/dry %) | 5 min | 30 min |
| 66 | 29 | 3 | 2 | 566 | 50 | 8.8 | 52 | 68 |
| 66 | 28 | 4 | 2 | 652 | 45 | 6.9 | 42 | 62 |
| 66 | 23 | 9 | 2 | 646 | 62 | 9.6 | 52 | 71 |
| 66 | 23 | 9 | 2 | 700 | 77 | 11.0 | 38 | 64 |
| 66 | 19 | 13 | 2 | 741 | 86 | 11.6 | 36 | 65 |
| 66 | 17 | 15 | 2 | 763 | 97 | 12.7 | 45 | 74 |

This example demonstrates that the temporary wet strength resins of the present invention exhibit excellent initial wet strength and excellent decay over time over a wide range of compositions and tensile strengths.

EXAMPLE VII

Handsheets containing 0.5% of the temporary wet strength resin of the present invention with the same structure as in Example VI, but different compositions were made according to the procedure described above.

The handsheets were then tested for dry tensile, initial wet tensile and wet tensile decay. The results are presented below.

| Resin Composition (mole %) | | | | Molecular Weight | Initial Strength | | | Wet Tensile Decay (%) | |
|---|---|---|---|---|---|---|---|---|---|
| W | X | Y | Z | | dry (g/in) | wet (g/in) | (wet/dry) % | 5 min | 30 min |
| 76 | 11 | 8 | 5 | 63,000 | 703 | 131 | 19 | 35 | 66 |
| 81 | 7 | 7 | 5 | 47,000 | 625 | 102 | 18 | 54 | 73 |
| 69 | 17 | 12 | 3 | 29,000 | 485 | 81 | 17 | 69 | 84 |
| 66 | 25 | 7 | 3 | 18,000 | 616* | 71 | 12 | 61 | 83 |

-continued

| Resin Composition (mole %) | | | | Molecular Weight | Initial Strength | | | Wet Tensile Decay (%) | |
|---|---|---|---|---|---|---|---|---|---|
| W | X | Y | Z | | dry (g/in) | wet (g/in) | (wet/ dry) % | 5 min | 30 min |
| 48 | 34 | 9 | 9 | 12,000 | 666 | 90 | 14 | 70 | 74 |
| 46 | 40 | 10 | 4 | 15,000 | 720* | 86 | 12 | 67 | 77 |
| 32 | 55 | 10 | 3 | 14,000 | 1004* | 198 | 20 | 53 | 68 |
| 26 | 63 | 7 | 4 | 25,000 | 721* | 110 | 15 | 49 | 64 |

*Tested at 1% instead of 0.5%.

The data from the first four entries in the table suggest that as the molecular weight of the temporary wet strength resin decreases, the amount of wet tensile decay increases. The data from the last five entries suggest that as the relative amount of the nonnucleophilic unit decreases, the amount of wet tensile decay also decreases.

EXAMPLE VIII

Paper was made according to the teachings of Sanford and Sisson, U.S. Pat. No. 3,301,746, issued Jan. 31, 1967, and U.S. Pat. No. 3,994,771, Morgan and Rich, issued Nov. 30, 1976. The papermachine used a single headbox with internal partitions ("leaves") which created a discretely layered three-layer paper sheet. The headbox was of the fixed roof former type. The center layer of the sheet was comprised of northern softwood Kraft (Grande Prairie, Procter & Gamble Cellulose). This center layer comprised thirty percent (30%) of the total weight of the sheet, and 2.2 lbs. per ton of the temporary wet strength resin of this invention was added into this layer. The outside two layers were identical, and each was 35% of the total sheet weight. These layers were comprised of northern Aspen bleached sulfite pulp. The headbox dilution water (the "wire pit" water) was natural water which was acidified with HCl to an approximate pH of from about 5.5 to 5.9. The discretely layered sheet was formed on a polyester wire manufactured by Appleton Wire Works. This wire was an "84M"; that is, the weave was 84×76 filaments per inch, in a five-shed pattern. The embryonic paper web was transferred to a 36×32 five-shed fabric manufactured by Wisconsin Wire. These patterns and their use are described in Trokhan, U.S. Pat. No. 4,191,609, and Trokhan, U.S. Pat. No. 4,239,065.

The embryonic paper sheet was first dried with hot air in a flow-through dryer. Such a hot air dryer is well known to those skilled in the art, and the predried web had approximately 35% moisture remaining. The final drying was accomplished on the surface of a Yankee dryer (to which the web had been adhered with polyvinyl alcohol). The paper was dried to approximately 3% moisture, and then creped from the Yankee with a doctor blade. The paper web was drawn away from the doctor blade zone and reeled to provide an ultimate residual crepe of about 20%.

The resulting tissue paper was then tested for dry tensile, wet tensile and wet tensile decay as described above in the Test Methods section. Results are presented below.

| Resin Composition (mole %) | | | | Molecular Weight | Initial Strength | | | Wet Tensile Decay (%) | |
|---|---|---|---|---|---|---|---|---|---|
| W | X | Y | Z | | dry (g/in) | wet (g/in) | (wet/ dry) % | 5 min | 30 min |
| 49 | 37 | 11 | 3 | 23,000 | 461 | 52 | 11.3 | * | 74 |

*The tissue paper was not tested for 5 minute wet tensile decay.

What is claimed is:

1. Temporary wet strength resin polymers having the formula

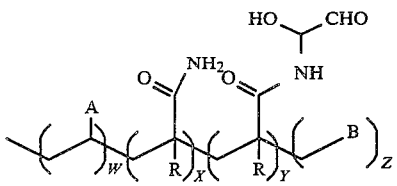

wherein A is a polar, non-nucleophilic unit which does not cause said resin polymer to become water-insoluble; B is a hydrophilic, cationic unit which imparts a positive charge to the resin polymer; each R is H, $C_1$–$C_4$ alkyl or halogen;

wherein the mole percent of W is from about 58% to about 95%; the mole percent of X is from about 3% to about 65%; the mole percent of Y is from about 1% to about 20%; and the mole percent of Z is from about 1% to about 10%; said resin polymer having a molecular weight of from about 5,000 to about 200,000.

2. Temporary wet strength resin polymers according to claim 1 wherein A is selected from the group consisting of

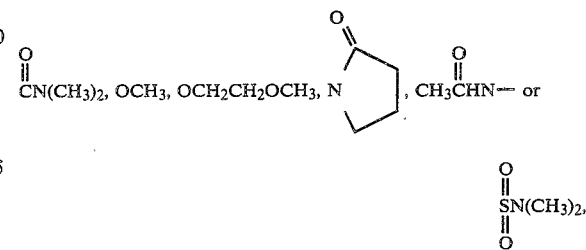

3. Temporary wet strength resin polymers according to claim 2 wherein the cationic monomer containing the unit B is selected from the group consisting of 2-vinyl-N-methylpyridinium chloride, diallyldimethyl ammonium chloride, p-vinylphenyltrimethyl ammonium chloride, 2-(dimethylamino)ethyl acrylate, trimethyl(p-vinylbenzyl)ammonium chloride, p-dimethylaminoethyl styrene, dimethylaminopropyl acrylamide, 2-methylacryloyloxyethyltrimethyl ammonium methylsulfate and 3-acrylamido-3-methylbutyltrimethyl ammonium chloride.

4. Temporary wet strength resin polymers according to claim 3 wherein R is H or $CH_3$.

5. Temporary wet strength resin polymers according to claim 4 wherein W is from about 30% to about 85%; X from about 9% to about 60%; Y is from about 5% to about 20%; and Z is from about 1% to about 5%.

6. Temporary wet strength resin polymers according to claim 5 wherein A is

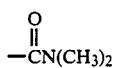

7. Temporary wet strength resin polymers according to claim 6 having a molecular weight of from about 5,000 to about 112,000.

8. Temporary wet strength resin polymers according to claim 7 selected from the group consisting of

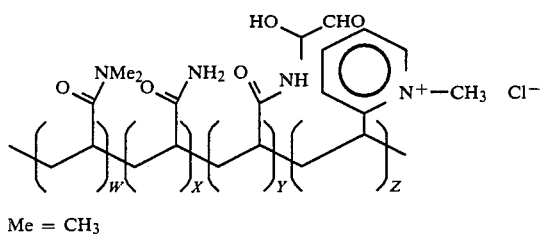

Me = $CH_3$

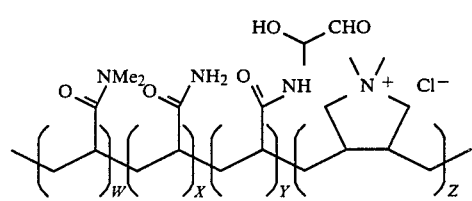

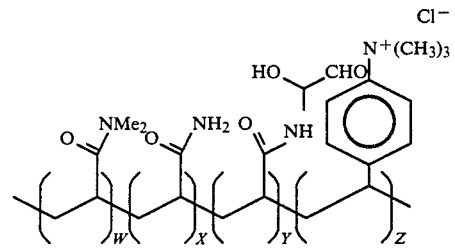

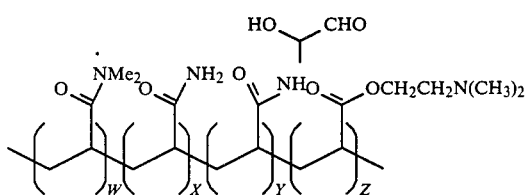

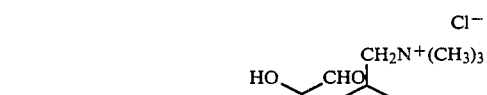

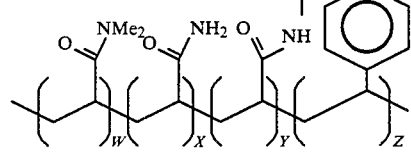

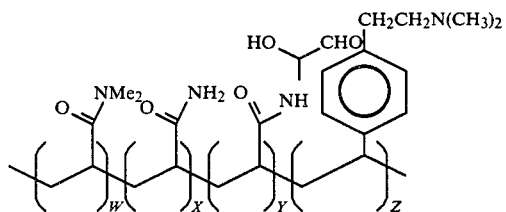

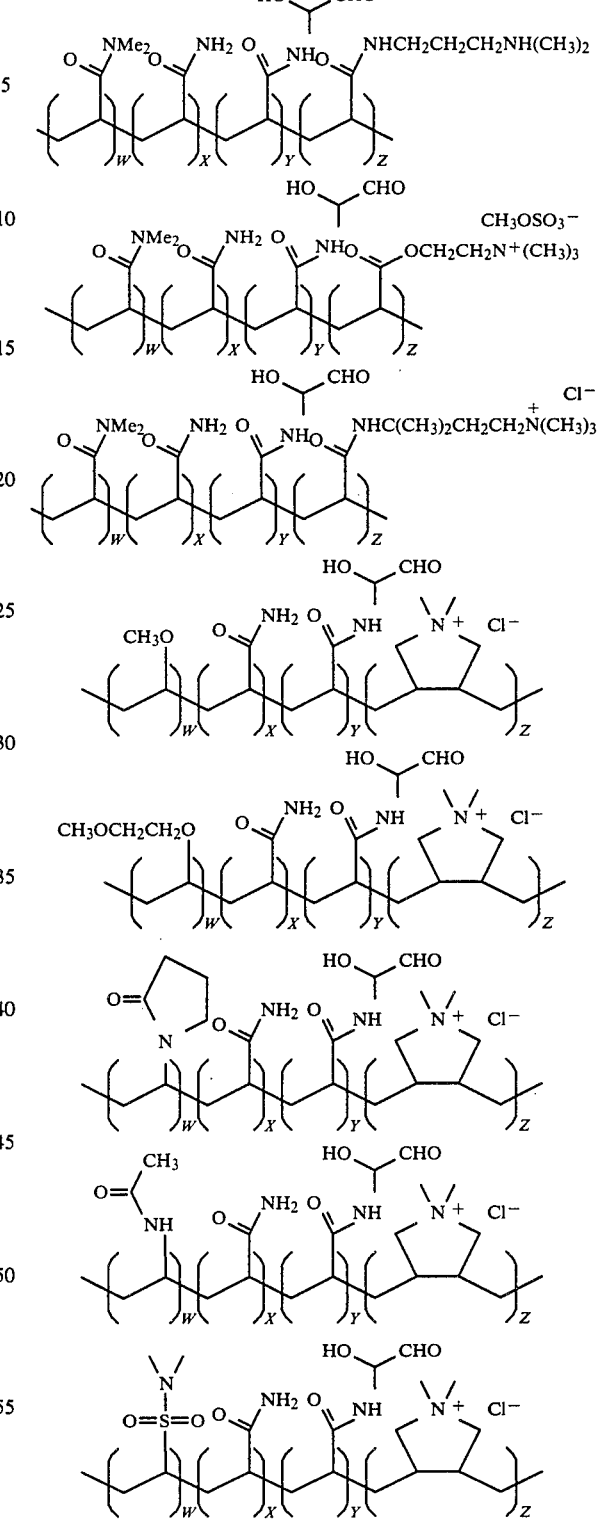

9. A cellulosic fibrous non-woven web comprising from about 0.005% to about 2% of the temporary wet strength resin polymer of claim 1.

10. A cellulosic fibrous non-woven web comprising from about 0.005% to about 2% of the temporary wet strength resin polymer of claim 8.

11. A cellulosic fibrous non-woven web according to claim 9 wherein said non-woven web is tissue paper.

12. A cellulosic fibrous non-woven web according to claim 10 wherein said non-woven web is tissue paper.

UNITED STATES PATENT AND TRADEMARK OFFICE
CERTIFICATE OF CORRECTION

PATENT NO. : 4,603,176

DATED : July 29, 1986

INVENTOR(S) : David W. Bjorkquist
William W. Schmidt

It is certified that error appears in the above–identified patent and that said Letters Patent are hereby corrected as shown below:

IN THE CLAIMS:

Column 16, line 28, "58%" should read -- 5% --.

Signed and Sealed this

Twenty-fourth Day of February, 1987

Attest:

DONALD J. QUIGG

Attesting Officer

Commissioner of Patents and Trademarks